US011305571B2

United States Patent
Marks

(10) Patent No.: US 11,305,571 B2
(45) Date of Patent: *Apr. 19, 2022

(54) FILM FOR SHEET FED PRINTING, SHEETS FORMED FROM SUCH FILM AND LABELS FORMED FROM SUCH SHEETS

(71) Applicant: Taghleef Industries Inc., Newark, DE (US)

(72) Inventor: Bruce S. Marks, Glen Mills, PA (US)

(73) Assignee: TAGHLEEF INDUSTRIES INC., Newark, DE (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/580,704

(22) Filed: Sep. 24, 2019

(65) Prior Publication Data

US 2020/0016915 A1    Jan. 16, 2020

Related U.S. Application Data

(63) Continuation of application No. 15/307,666, filed as application No. PCT/US2015/028281 on Apr. 29, 2015, now Pat. No. 10,457,080.

(60) Provisional application No. 61/986,484, filed on Apr. 30, 2014.

(51) Int. Cl.
| | |
|---|---|
| B32B 3/10 | (2006.01) |
| B41M 5/52 | (2006.01) |
| B32B 27/08 | (2006.01) |
| B32B 27/32 | (2006.01) |
| B41M 5/50 | (2006.01) |
| B32B 27/18 | (2006.01) |
| B32B 27/20 | (2006.01) |
| G09F 3/02 | (2006.01) |

(52) U.S. Cl.
CPC ............... *B41M 5/52* (2013.01); *B32B 27/08* (2013.01); *B32B 27/18* (2013.01); *B32B 27/20* (2013.01); *B32B 27/32* (2013.01); *B41M 5/504* (2013.01); *B41M 5/508* (2013.01); *B41M 5/5218* (2013.01); *B41M 5/5254* (2013.01); *G09F 3/02* (2013.01); *B32B 2250/242* (2013.01); *B32B 2255/10* (2013.01); *B32B 2264/10* (2013.01); *B32B 2264/102* (2013.01); *B32B 2264/12* (2013.01); *B32B 2307/518* (2013.01); *B32B 2307/746* (2013.01); *B32B 2307/75* (2013.01); *B32B 2519/00* (2013.01); *B41M 5/502* (2013.01); *B41M 2205/34* (2013.01); *B41M 2205/36* (2013.01); *G09F 2003/0201* (2013.01); *G09F 2003/0226* (2013.01); *G09F 2003/0257* (2013.01)

(58) Field of Classification Search
None
See application file for complete search history.

(56) References Cited

U.S. PATENT DOCUMENTS

| | | |
|---|---|---|
| 5,498,474 A | 3/1996 | Shuhmann et al. |
| 5,501,901 A | 3/1996 | Schulhmann et al. |
| 5,508,090 A | 4/1996 | Peiffer et al. |
| 5,840,419 A | 11/1998 | Alder et al. |
| 5,900,310 A | 4/1999 | Murschall et al. |
| 5,972,496 A | 10/1999 | Bader et al. |
| 6,326,068 B1 | 12/2001 | Kong et al. |
| 6,445,150 B1 | 9/2002 | Tanner et al. |
| 6,623,866 B2 | 9/2003 | Migliorini et al. |
| 6,682,822 B2 | 1/2004 | Cretekos et al. |
| 6,902,822 B1 | 6/2005 | Chang et al. |
| 6,939,602 B2 | 9/2005 | McGee et al. |
| 9,533,476 B2 | 1/2017 | Kochem et al. |
| 10,457,080 B2 | 10/2019 | Marks |
| 2002/0064646 A1 | 5/2002 | Cretekos et al. |
| 2003/0211298 A1 | 11/2003 | Migliorini et al. |
| 2005/0100751 A1 | 5/2005 | Nishizawa et al. |
| 2007/0248810 A1 | 10/2007 | McGee et al. |
| 2009/0011183 A1 | 1/2009 | Kochem et al. |
| 2012/0282447 A1 | 11/2012 | Gringoire et al. |
| 2013/0209756 A1* | 8/2013 | Squier .................. B32B 27/205 428/195.1 |
| 2013/0209765 A1 | 8/2013 | Squier et al. |

FOREIGN PATENT DOCUMENTS

| | | |
|---|---|---|
| CN | 1492800 A | 4/2004 |
| EP | 0612613 A1 | 8/1994 |
| EP | 0615839 A1 | 9/1994 |
| EP | 0618070 A1 | 10/1994 |
| EP | 0623463 A1 | 11/1994 |

(Continued)

OTHER PUBLICATIONS

International Search Report for PCT/US2015/028281 dated Jun. 17, 2015.
Indonesian Examination Report dated Jan. 17, 2020.

*Primary Examiner* — Christopher M Polley
(74) *Attorney, Agent, or Firm* — Caesar Rivise, PC

(57) ABSTRACT

A plurality of plastic sheets to be fed into a high speed printer for forming printed labels and similar articles and a stack of printed labels formed form the sheets. Each of the sheets or labels includes a core layer and opposed, upper and lower outer skin layers. The upper outer skin layer includes a polyolefin polymer as the predominant component, by weight, thereof and is capable of receiving printed indicia thereon. The core layer includes a polyolefin polymer as the predominant component, by weight, of the core layer; preferably a high crystallinity polypropylene homopolymer. The lower outer skin layer includes a polyolefin polymer as the predominant component by weight therein; the improvement wherein the lower outer skin layer includes a blend of organic and inorganic antiblocking agents or a blend of inorganic antiblocking agents; the blend including less than 10%, by weight, of the lower outer skin layer.

9 Claims, No Drawings

(56) References Cited

FOREIGN PATENT DOCUMENTS

| | | |
|---|---|---|
| EP | 0826491 B1 | 11/2001 |
| EP | 1591236 A2 | 11/2005 |
| EP | 2181843 A1 | 5/2010 |
| EP | 2502744 A1 | 9/2012 |
| EP | 3137298 A1 | 3/2017 |
| WO | 2006115585 A2 | 11/2006 |
| WO | 2009042299 A1 | 4/2009 |
| WO | 2011162882 A1 | 12/2011 |
| WO | 2015168277 A1 | 11/2015 |

* cited by examiner

FILM FOR SHEET FED PRINTING, SHEETS FORMED FROM SUCH FILM AND LABELS FORMED FROM SUCH SHEETS

CROSS-REFERENCE TO RELATED APPLICATIONS

This is a continuation application of U.S. application Ser. No. 15/307,666, filed on Oct. 28, 2016, which in turn is a national application claiming the benefit of the Apr. 29, 2015 filing date of PCT application PCT/US15/28281, which in turn claims priority and the benefit under 35 U.S.C. § 119(e) of U.S. Patent Application Ser. No. 61/986,484, filed on Apr. 30, 2014, entitled, FILM FOR SHEET FED PRINTING, SHEETS FORMED FROM SUCH FILM AND LABELS FORMED FROM SUCH SHEETS, the entire disclosures of which is incorporated by reference herein.

BACKGROUND

Field of the Invention

This invention relates generally to multilayer film structures; to discrete sheets formed from said film structures for use in a sheet fed printing operation, more specifically to sheets to be fed into a high speed printer to form labels and other printed sheet material. In addition, this invention relates to employing the sheets in a sheet fed printing operation and also to cut and stack labels and stack-fed in-mold labels formed from rolls or sheets, said cut and stack labels being separable from a stack and employed both as wrap around and spot labels on preformed articles, e.g., containers, boxes, bottles, etc., and said stack-fed in-mold labels being separable from a stack for in-mold and cut and stack labeling applications.

Background Art

A significant issue or problem in the high speed printing of plastic sheets, preferably polyolefin sheets, is to achieve the required separation of adjacent sheets to be printed to assure proper feeding and printing of the individual sheets in a high speed printing operation. It should be understood that individual sheets directed to the printer have numerous applications, including use in the formation of labels for various container structures, including preformed structures and for use in in-mold labeling.

In a high speed printing operation, individual sheets to be printed can be fed from a stack or alternatively a continuous roll of the multilayer film of this invention can be fed in-line through a sheeting device located prior to the printer to form the individual sheets that are then directed through the printer. Whether the sheets are fed from a stack or continuously from a roll, the individual sheets are positioned in a shingled arrangement as they are being directed through the printer to achieve the desired high speed printing operation. To further explain, as a leading sheet is directed through the printer its distal end is lifted to permit a proximal end of an adjacent trailing sheet to be disposed under the distal end of the leading sheet in a shingled arrangement. This provides the desired close positioning between the proximal ends of the adjacent sheets to achieve the desired high speed printing of the sheets, provided that the shingled sheets properly separate from each other as they are directed through the printing operation.

Thus, whether the sheets are in a stack prior to being directed through the printer in a shingled arrangement or are positioned in a shingled arrangement in a continuous printing operation in which a roll of the multilayer film is sheeted prior to the sheets being printed, a bottom surface of a leading sheet needs to cleanly separate from an upper surface of an adjacent trailing sheet so as not to adversely affect the printing operation. In the case of sheets being fed from a stack the entire bottom surface of a leading sheet engages an entire upper surface of an adjacent trailing sheet prior to separation from the stack. Thus, when sheets are to be fed from a stack an issue exists in both cleanly separating adjacent sheets from the stack and then subsequently separating adjacent sheets from their contacting, shingled arrangement as they are being directed through the printer. In the case of a continuous operation in which discrete sheets are cut from a roll of film and then directed through the printing operation in a shingled arrangement, only the distal end of the bottom surface of the leading sheet engages the proximal end of the upper surface of the adjacent trailing sheet and it is only these engaging surface regions that need to be cleanly separated. If adjacent contacting sheets are not cleanly separated from each other a leading sheet can undesirably drag or move the trailing sheet in contact with it as the leading sheet is being separated from the trailing sheet and directed to, or through the printer. This improper movement of the trailing sheet can be caused by blocking between the engaging surfaces of adjacent sheets, the build-up of static charges between the engaging surfaces and/or frictional drag between those surfaces. The undesired blocking effect is more common when the sheets have been maintained in a stack for a significant period of time prior to printing. In this case, the weight of the stack tends to expel air from between the contacting surfaces of adjacent sheets to create the blocking effect. However, the adverse effect of static charge build up and/or frictional drag is prevalent in the high speed printing of the sheets both from a stack of the sheets or in a continuous printing operation in which the sheets are cut from a continuous roll of multilayer film prior to be directed through the printing operation.

In addition, regardless how labels are formed in a high speed printing operation they often are provided in a stack; either as cut and stack labels or as stack-fed in-mold labels. In either case, contacting labels need to be cleanly separated from each other. Thus the problems of providing reliable and correct separation of sheets directed through a printer also apply to stacks of labels formed from the sheets, or even from continuous rolls in a roll-to-roll printing operation.

It is known that creating a roughened surface between contacting, adjacent sheets or labels traps air between them to prevent blocking, static charge build up and/or drag to aid in permitting a leading sheet or label to move freely over and separate from the underlying, engaging surface of an adjacent trailing sheet or label to permit accurate separation and printing of the individual sheets and accurate separation and application to labels on products or into molds, in the case of in-mold labeling processes.

One means of achieving a rough surface texture is to use matte polymer compounds, generally composed of a physical mixture of two immiscible polymers, i.e., homopolymer polypropylene and high density polyethylene or other polyethylene structures. However, it has been determined that the use of blends of incompatible polymers can cause difficulties in processing the film on a tenter line, especially when using a high crystalline polypropylene (HCPP) in the core layer of the extruded film. Specifically, the high processing temperature required to stretch the HCPP in the machine direction can cause sticking of the matte skin polymers on the machine direction orientation (MDO) rolls due to the presence of the relatively low melting polyethylene in the blend.

Although it has been suggested in the prior art to provide a roughened surface by including anti-block materials in the surface layer that protrude through the surface thereof, those suggestions have been quite general; providing very little guidance in selecting a desired combination of anti-block compounds for providing the required roughened outer surface to permit the continuous, reliable separation of individual leading and trailing polyolefin sheets from each other as the individual sheets are being directed to and/or through a high speed printing operation.

Representative disclosures of using anti-block additives in a skin surface or other layer of an oriented polyolefin film are included in U.S. Pat. No. 6,623,866 (Migliorini et al.); U.S. Publication No. 2003/0211298 (Migliorini et al.); U.S. Publication No. 2012/0282447 (Gringoire et al.); European publication 026491 (Hayes); US Publication 2007/0248810 (McGee et al.); U.S. Pat. No. 6,939,602 (McGee et al.); International Publication WO 2011/162882 (Squire et al.) and International Publication WO 2009/042299 (Keung). The disclosures in these prior art publications are fully incorporated by reference herein.

The Migliorini et al '298 publication discloses a multilayer structure that can include anti-block agents in a lower or inner skin layer thereof. The publication generally discloses that the anti-block agents can include talc, and possible other additives and provides a general disclosure that different sizes and shapes can be blended together to optimize machinability. However, this publication provides little guidance as to the manner in which different anti-block agents should be combined to achieve any desired result, and in fact is not directed to the issue of enhancing separation of individual sheets in a stack to be fed into a high speed printer.

The Migliorini et al. '866 patent also generally discloses the use of a combination of organic and inorganic anti-block additives, such as talc and PMMA, but discloses the use of those additives in an inner or tie layer, not in an outer skin layer for the purpose of enhancing separation of individual sheets in a stack of sheets to be directed into a high speed printer.

In a similar vein, the Hayes '491 European publication also discloses the use of organic and inorganic anti-block agents but only in an internal substrate layer of a multilayer product. Moreover, the general disclosure of employing organic and inorganic anti-blocking agents does not include any details as to how those materials should be combined to enhance separation of individual sheets from a stack to be directed into a high speed printer.

The McGee et al. '810 publication also includes a general disclosure of employing both an organic and inorganic anti-block agent in a film to prevent blocking between a back-side adhesive receiving coating and a front side layer intended to receive printing thereon. This publication does not provide any guidance as to the manner in which an organic or inorganic anti-block agent should be combined to achieve the benefits that are desired and achieved in the present invention, as will be discussed in greater detail hereinafter.

The Squire et al. '882 international publication discloses that polymethylmethacrylate is a well-known additive for use as an anti-blocking agent and also states that inorganic particulates can be used as an anti-blocking agent. This publication states that the anti-block agent can be incorporated into any of the layers, including the skin layer, but does not provide any guidance as to a desired combination of organic and inorganic additives that should be added for the purpose of permitting separation of individual sheets in a stack to permit such sheets to be directed through a high speed printing operation.

ExxonMobil Oil Corporation U.S. Pat. No. 6,326,068 discloses a multilayer film that can employ a blend of a non-distortable organic polymer and an inorganic particle. Although the '068 patent discloses employing blends of organic and inorganic anti-block materials in a multilayer polyolefin film, this patent does not disclose the combination of the specific antiblock components within the specific amounts determined to be beneficially employed in the present invention.

The McGee et al. '602 patent discloses a multilayer label structure that employs an inorganic coating on the first side of a first skin layer to prevent blocking. Exemplary coatings that are generically identified are talc, colloidal silica and amorphous silica.

The Gringoire et al. '447 publication discloses two side coated composite films or labels and discusses the problem of prior art films/labels blocking when the film is rolled or stacked. This publication generically discloses a number of inorganic compositions that can be employed as antiblock agents and includes silica and talc in the listed compositions. The '447 publication states that typically the inorganic material is present in an amount from about 10 wt. % to about 70 wt. %; more preferably 35-50 and most preferably 10-30, wherein the inorganic material is a silica. There is no specific disclosure of combining silica with any other specific polymers and the percentages in which they should be combined.

The Keung '299 International Publication discloses a multi-layered opaque film including two skin layers. Exemplary antiblocking agents that are disclosed include silica-based products, PMMA and polysiloxanes. In addition, talc is disclosed as being suitable filler. There is no disclosure of employing a combination of any antiblock agents in any specified or desired proportions.

It also has been disclosed in the prior art, particularly in the formation of rigid plastic articles, to employ a coupling agent, e.g., maleic anhydride-modified polypropylene homopolymer and other polymeric and non-polymeric compositions, to aid in adhering an inorganic material, such as talc, in a layer of the product. The disclosed purpose of using the disclosed coupling agents is to minimize the plating out of the talc during a converting process. What is not disclosed or suggested in the prior art is that the use of a maleic anhydride-modified polypropylene homopolymer in individual multilayer films or sheets permits the use of substantially lower quantities of talc than otherwise was thought possible to achieve the desired separation from each other of contacting surfaces of individual leading and trailing sheets as they are fed through a high speed printing operation.

Prior to this invention, it was believed that a substantially high level of finely divided talc particles on the order of 25% by weight of the skin layer was required to permit the desired feeding of individual sheets from the stack and/or shingled arrangement into and through a high speed printer. In fact, it was determined that employing such a large percentage of talc did permit the required individual separation of sheets but created an undesirable, excessive dusting problem that interfered with the processing operation. The present invention achieves the desired antiblocking, static reduction and reduction of drag between adjacent leading and trailing sheets directed through a high speed printing operation while also eliminating any undesired dusting problem.

SUMMARY OF THE INVENTION

In accordance with this invention, individual plastic sheets formed from a continuous roll of plastic film in accordance with this invention are to be fed into and through a high speed printer for forming printed labels and similar articles. The bottom surface of the individual sheets engage an upper printable surface of adjacent, trailing sheet when the sheets are fed from a stack and/or when the sheets are in a shingled arrangement as they are being fed through the printing operation. Each of the sheets includes a core layer and opposing upper and lower outer skin layers. The upper outer skin layer includes a polyolefin polymer as the predominant component by weight thereof and this outer skin layer is capable of receiving printed indicia thereon that is applied by the high speed printer. The core layer includes a polyolefin polymer as the predominant component, by weight, thereof, and the lower outer skin layer includes a polyolefin polymer as the predominant component by weight thereof.

In the formation of printed labels multiple labels are printed on each sheet, or alternative from a roll, and the individual labels cut from the sheet and stacked, usually in a magazine, either as cut and stack labels or as stack-fed in-mold labels. The individual labels are then separated and individually fed into labeling equipment to apply individual labels to the outer surface of preformed articles, such as containers, or into a mold for use in forming in-mold labels. Thus, this invention also relates to cut and stack labels and to stack-fed in mold labels regardless how the labels are formed, e.g., in a continuous roll-to-roll printing operation or from the printing of individual sheets.

The improvement in accordance with this invention resides in the composition of the lower outer skin layer of the multilayer roll of film; of the individual sheets formed from said roll and of the stacked printed labels cut from the sheet or roll. It should be noted that the individual labels cut from the printed sheets of this invention are of the same multilayer structure as the sheets of this invention and of the multilayer roll of film from which the sheets are formed. In the cut and stacked arrangement the labels have the same orientation of individual layers as the orientation of the individual layers in the sheets and/or rolls, as directed through a printing operation.

Thus, the structure of the lower outer skin layer of the sheets of this invention, which permits the sheets to be individually separated from upper printable surfaces of adjacent, trailing sheets for feeding into a high speed printer, is the same structure that exists in the lower outer skin layer of individual labels cut from the sheets. This permits the labels to be individually and cleanly separated from a stack of such labels to carry out a desired labeling operation.

Although this invention primarily will be described in connection with the structure of the individual sheets that are to be fed through a high speed printer, the description applies equally to the structure of the multilayer roll of plastic film from which the sheets are formed and also to the printed labels cut and stacked from the sheets for being fed individually into a desired labeling operation, e.g., for labeling a preformed article or for use in an in-mold labeling operation.

Specifically, the lower outer skin layer of the plastic film, the sheets formed therefrom and the individual labels formed from the sheets, includes a either a blend of organic and inorganic antiblocking agents or a blend of only inorganic antiblocking agents; said blend including less than 10% by weight of the lower outer skin layer.

In one embodiment of this invention, the blend includes polymethylmethacrylate (PMMA) (i.e., an organic antiblocking compound) and talc (i.e., an inorganic antiblocking compound), the talc being present in a higher percentage by weight than the PMMA.

In the most preferred embodiment of the invention the blend includes an organic antiblocking compound and at least two inorganic antiblocking compounds; one of said inorganic compounds is of an irregular particulate shape that is roughly spherical with an irregular surface and the other of said inorganic compounds is generally plate-like. In the most preferred embodiment the roughly spherical particles are silica and the plate like particles are talc. The preferred organic antiblocking compound is PMMA. In this most preferred embodiment it has been determined that individual sheets can be fed from a stack and through a printer at faster speeds without dusting and with less double picking of printed sheets from the stacks, than the prior art sheets and even faster than sheets within the scope of this invention that include talc in combination with either PMMA or silica.

In the preferred form of this invention, the lower outer skin layer of each of the sheets includes less than 2% talc, by weight, based on the weight of the lower outer skin layer and also employs a coupling agent, e.g., maleic anhydride-modified polypropylene homopolymer and possibly other polymer and non-polymeric compositions for aiding in adhering the talc within the lower outer skin layer, and further wherein the PMMA is present in a weight percent of less than 1 based on the weight of the lower outer skin layer.

In the most preferred embodiment of this invention, the coupling agent is a maleic anhydride-modified polypropylene homopolymer prepared by utilizing about 0.5% maleic anhydride and the lower outer skin layer of each of the sheets includes between 1% and 2% talc, by weight, based on the weight of the lower outer skin layer. The maleic anhydride-modified polypropylene homopolymer is employed for aiding in adhering the talc in the lower outer skin layer; with the PMMA being present in a weight percentage less than 0.5% based on the weight of the lower outer skin layer.

However, as discussed in greater detail herein, other coupling agents are believed to be usable in this invention to bind the talc into the structure to prevent undesired dusting. In addition to being required to effectively bind the talc into the structure, factors such as availability, cost, easy of processing, etc. should be taken into account in selecting the coupling agent for use in this invention.

Most preferably, when maleic anhydride-modified polypropylene homopolymer is utilized as the coupling agent it is present in a weight percent of about 5% based on the weight of the lower outer skin layer and includes about 0.5% maleic anhydride therein.

DESCRIPTION OF THE PREFERRED EMBODIMENT

This invention relates to a continuous, multilayer plastic film and to individual plastic sheets cut from the film to be fed through a high speed printer for forming printed labels and similar articles. This invention also relates to printed labels formed from the plastic sheets or directly from a roll of the plastic film. Most preferably the continuous multilayer film from which individual sheets or labels of this invention are cut is formed by extrusion on a conventional tenter machine, and most preferably the film is biaxially oriented in the formation process. The specific equipment used to form single and multilayer plastic films is well known in the art and does not constitute a limitation on the broadest aspects of this invention. In addition, high speed printers are well known in the art; the particular printer employed to print the individual sheets not constituting a limitation on the present invention.

However, it should be noted that the high speed printers commonly employed in the formation of printed sheets include a shingling device to lift the distal end of a leading sheet being directed through the printer so as to receive the proximal end of an adjacent trailing sheet under the distal end of the leading sheet in a shingled arrangement. The shingled arrangement of the adjacent leading and trailing sheets as they are being directed through a high speed printer has been discussed in detail earlier in this application. It should be noted that the shingled arrangement is provided between adjacent leading and trailing sheets directed through the printer, whether the sheets are preformed and fed from a stack, or are continuously formed from a roll of film prior to directing the sheets through the printing operation.

As noted above, although this invention will be described primarily with respect to the structure of individual plastic sheets that are fed individually through a high speed printer, the description that follows applies equally to the roll of plastic films from which the sheets are formed and also to the individual, printed labels cut and stacked from the sheets to be fed individually from the stack to be applied to a desired article, e.g., a preformed article or to an in-mold labeling operation where the label is applied to an article as it is molded.

In other words, the specific structure and composition of the layers in the individual sheets is the same structure and composition as the plastic film from which the sheets are formed and of the labels cut from the sheets. Moreover, the mechanism permitting separation of adjacent, leading and trailing sheets as they are directed to and/or through a high speed printing operation is essentially the same mechanism permitting separation of individual labels from a stack of such labels.

However, as noted earlier, when the sheets are separated from a stack that has been maintained in a stacked condition for a significant period of time prior to being directed to a printer, air between adjacent, contacting sheet surfaces in the stack tends to be expelled to enhance the undesired blocking of the adjacent sheets being separated from the stack to be directed into and through a high speed printing operation. Although the blocking issue is not as significant when the sheets are continuously cut from a roll of film and are directed through the printer in a shingled arrangement, the undesired creation of static charges and drag still exists, which can prevent the required "clean" separation of the leading sheet from the underlying trailing sheet as the shingled sheets are being directed through the printing operation. This undesired failure of adjacent sheets separating from each other results in skewed sheets at the in feed of a printing machine or in two labels being simultaneously directed through the in mold label picking operation at the same time, or two cut and stack labels simultaneously being fed onto a container; a problem generally referred to as "double picking." In less typical printing from pre-cut sheets of film, as opposed to rolls that are in-line sheeted, this problem is generally referred to as a "double feed."

As will be pointed out in detail hereinafter, in the most preferred embodiment of this invention, all of the polymers employed in the film other than PMMA are polyolefins. The major polymer component, by weight, in the core layer is a polypropylene homopolymer; most preferably a high crystalline polypropylene.

Reference throughout this application to the film being a "polypropylene" film refers to a film wherein the primary component, by weight, in the core is a polypropylene homopolymer, a high crystalline polypropylene homopolymer or a minirandom copolymer.

A minirandom propylene copolymer includes ethylene in a sufficiently small percentage to avoid adversely affecting the crystalline properties of the polypropylene. Most commonly, the percentage of ethylene by weight in the copolymer is less than 2% and most preferably is 1% or less.

Reference throughout this application to "high crystalline polypropylene" refers to a polypropylene having an isotactic index of at least 95% and more preferably at least 98%.

Referenced throughout this application to "upper" and "lower" in identifying the outer skin layers of multilayer sheets, or labels formed from the sheet refer to the orientation or position of the outer skin layers with the sheets and labels as they are individually fed, respectively, into and through a high speed printer and into a labeling operation.

It should be understood that the particular composition of the core layer does not constitute a limitation on the broadest aspects of this invention. However, this invention is particularly beneficial for use in a multilayer film in which a high crystalline polypropylene is the predominant polymer component of the core layer, by weight. This provides the most desired stiffness to labels formed from the sheets. Moreover, in forming opaque films a voiding agent, e.g., calcium carbonate can be included in the core in conventional, well-known amounts. This invention applies to both clear and opaque films.

A unique feature of this invention for solving separation and dusting problems, as discussed above, resides in the composition of the lower outer skin layer. The skin layer includes a unique and unobvious blend of antiblocking components in the lower outer skin layer of the multilayer structures of the roll of films, the sheets cut from the film and the labels or other printed substrates formed from the sheets, as will be described in detail hereinafter.

In accordance with this invention, a multi-layer polyolefin film includes a central core layer and opposed upper and lower outer skin layers. The number of layers can be varied in accordance with the broadest aspects of this invention. However, the multilayer film should be at least three layers; including a central core and opposed upper and lower outer skin layers. If desired, one or more intermediate tie layers can be employed in the structure.

In a representative embodiment of this invention, the core layer has a nominal thickness of 330 ga. (82.5 microns). In another representative embodiment the core layer has a nominal thickness of 280 ga. (70 microns). The specific thickness of the core layer does not constitute a limitation on the broadest aspects of the invention. However, the core layer most preferably is the thickest layer in the structure; far exceeding the thickness of outer skin layers in a three layer structure. In a representative embodiment of this invention, the core layer includes over 50% and more preferably approximately 70% of a high crystalline polypropylene, sold under the designation Braskem Inspire 6025 by Braskem America having its corporate offices in Philadelphia Pa.; approximately 7.5% of a propylene/ethylene copolymer including 2.5% by weight ethylene sold under the designation Braskem DS6D21 by Braskem America; CaCO3 (voiding agent) and TiO2 (whitening agent) in percentages conventionally employed to provide a white, voided structure, and a small percentage of one or more slip agents, such as Erucamide and Behenamide, as is well known in the art.

The specific formulation of the core layer described above is for illustrative purposes and does not constitute a limitation on the broadest aspects of this invention. For example, in clear films the voiding agent will be omitted from the core.

However, as noted earlier herein, in the most preferred embodiment of this invention a high crystalline polypropylene constitutes the predominant polymer component by weight in the core layer. The inclusion of a high crystalline polypropylene as the predominant polymer component of the core layer yields a much higher stiffness film than can be achieved using a typical film grade homopolymer polypropylene. Such stiffness is highly desirable in various label structures.

In a representative embodiment of this invention, both the upper and lower outer skin layers have a thickness of approximately 10 ga. (2.5 microns) and the outer surfaces of both layers preferably are oxidatively treated, e.g., by corona treatment. The oxidative treatment of the upper outer skin layer enhances its surface condition for receiving printed indicia thereon as is well known in the art.

The oxidative treatment of the outer surface of the lower outer skin layer actually enhances the ability of the final product such as a label to be adhesively bonded to a substrate using any of the commonly used adhesives for that purpose, such as a hot melt adhesive.

The upper outer skin layer can be of any well know composition suitable for receiving desire printed indicia thereon; the specific composition not constituting a limitation on the broadest aspects of this invention. For example, the outer layer can include approximately 90% of a C2C3 copolymer and less than 5% of a C2 homopolymer. In addition the upper layer can include other well-known additives, such as slip agents and antistatic agents.

As noted above, the specific composition of the upper outer skin layer does not constitute a limitation on the broadest aspects of this invention. However, it clearly is preferred to employ a polyolefin as the predominant polymer component in the upper outer skin layer and most preferably to employ a C2C3 copolymer, which when oxidatively treated, is highly receptive to retaining printed indicia thereon. However, other polymers and copolymers can be employed, either alone or in combination with each other, e.g., C2C3C4 terpolymer, which are receptive to printed indicia.

The composition of the lower outer skin layer provides the unique benefits achieved in this invention.

In accordance with the most preferred embodiment of this invention the lower outer skin layer is predominantly a polyolefin and includes a unique combination of organic and inorganic antiblocking agents. Most preferably, at least two inorganic antiblocking agents are employed; one being irregularly shaped and generally spherical and the other being of a plate-like structure. Most preferably the irregularly shaped, generally spherical inorganic antiblocking agent is silica; most preferably a surface treated synthetic amorphous silica. Most preferably the plate-like structure is talc. Most preferably the talc has a d50=2-3 microns.

In the most preferred embodiment the organic antiblocking agent is PMMA. In the preferred structure a coupling agent is provided to bind together the particulate, antiblocking agents; one well-known coupling agent being a maleic anhydride-modified polypropylene homopolymer. In addition the lower outer surface, like the upper outer surface, can include other well-known additives such as slip and antistatic additives.

In the most preferred embodiment, the lower outer skin layer, which is predominantly a polyolefin, includes an organic and two inorganic antiblocking agents. This skin layer includes the following antiblocking agents, by weight: 2500 ppm (0.25%) silica (inorganic roughly spherical particulate material); 1.75% talc (inorganic plate-like material) and 2500 ppm (0.25%) PMMA (organic material). In addition, the lower outer skin layer includes a coupling agent of 5%, by weight, preferably maleic anhydride grafted polypropylene including 0.5% maleic anhydride, and also conventional slip and antistatic agents well known in the art.

As noted above, in the most preferred embodiment of this invention one of the inorganic antiblocking agents is a particulate that is roughly spherical with an irregular shape (e.g., silica) and the other inorganic antiblocking agent is generally plate-like (e.g., talc). Although not wishing to be bound by any theory the inventor believes that employing a combination of a roughly spherical antiblock agent and a generally plate like antiblock agents provides beneficial results because the combination of the two differently shaped antiblocking agents generates additional surface roughness, which allows for air entrainment between layers of film, facilitating the sheet-fed layers of film to more easily slide over one another in the printing process, and also for easier dispensing of individual labels from a magazine in the labeling operation.

In a second embodiment of this invention, the lower outer skin layer is approximately 82%, by weight of the layer, of a C2C3 copolymer and also including both an organic and an inorganic antiblock composition. The organic antiblock agent is PMMA and the inorganic antiblock agent is talc, both being included in the same weight percentages of the lower outer skin layer as set forth above in connection with the most preferred embodiment (i.e., 2500 ppm of PMMA and 1.75% talc). In addition, this lower outer skin layer includes 5% of a maleic anhydride-modified polypropylene homopolymer as a coupling agent for the particulate antiblocking agents and also conventional amounts of slip and antistatic agents; preferably the same slip and antistatic agents employed in the lower outer surface of the most preferred embodiment of the invention, as described above.

This latter-described, second embodiment has been determined to provide benefits in both reducing double picking and increasing printing speeds as compared to prior art sheets. However, the most preferred embodiment described earlier performs even better than this latter-described, second embodiment.

In a third embodiment of this invention, the lower outer skin layer includes approximately 90% by weight of the layer of a C2C3 copolymer including a small percentage, e.g. less than 5% of a C2 homopolymer. In addition, this embodiment includes two inorganic antiblock agents; one being a roughly spherical irregularly shaped particle have an irregular surface (e.g., preferably silica) and the other being a plate-like particulate material (e.g., preferably talc). The percentage of silica, by weight of the lower outer skin layer and the percentage, of talc, by weight of the lower outer skin layer are approximately the same is included in the most preferred embodiment of this invention (i.e., 2500 ppm silica and 1.75% talc). In addition, this third embodiment includes a coupling agent for bonding the antiblocking agents together. Most preferably the coupling agent is maleic anhydride grafted polypropylene present at approximately 5% by weight of the lower outer skin layer. As in the other embodiments of this invention other additives in conventional amounts can be employed, such as slip and antistatic agents.

This latter-described, third embodiment has been determined to provide benefits in both reducing double picking and increasing printing speeds as compared to prior art sheets. However, the most preferred embodiment described earlier performs even better than this latter-described, third embodiment.

It should be noted that in all embodiments the percentage of antiblocking agents, by weight, in the lower outer skin layer is less than 10%.

Also, in all of the preferred embodiments the talc had d50=2-3 microns.

It was not possible to predict the difference in performance of the above described sheets of this invention by simply comparing surface roughness values or coefficient of friction values of these respective sheets. Taking into account standard deviations the values for the respective three embodiments of this invention overlapped; making it virtually impossible to predict that the most preferred embodiment of this invention (multilayer polyolefin sheets including one organic antiblocking agent and two inorganic antiblocking agents in the lower outer surface), would perform better than the second and third embodiments of this invention, as described in detail above.

Also, the inclusion of a coupling agent presently is considered to be an important component in the lower outer skin layer to cooperate with the talc to secure or bind the talc into the lower outer skin layer. Although the coupling agent presently considered to be most preferred for use in this invention is a maleic anhydride-modified polypropylene homopolymer, other coupling agents are believed to be useable in this invention. In fact, in accordance with the broadest aspects of this invention it may not be necessary to use a coupling agent to bind the talc into the lower outer skin layer.

As noted above, although maleic anhydride-modified polypropylene homopolymer presently is considered the preferred coupling agent usable in this invention, other coupling agents also may be usable. For example, and not by way of limitation, silanes (azido functional or amido styryl functional), organofunctional silicone compounds, chlorinated hydrocarbons with and without silane, Titanates, in situ polymerization of monomers, modified polyolefins or an ethylene polar terpolymer such as Arkema's LOTADER resins may be usable as coupling agents in this invention. The above list of possible coupling agents is not intended to be exhaustive; only to represent that a variety of types of coupling agents may be usable in this invention. However, at the present time maleic anhydride-modified polypropylene homopolymer is the most preferred coupling agent usable in this invention. Therefore, the description, which follows will be limited to the use of maleic anhydride-modified polypropylene as the coupling agent employed in the lower outer skin layer of the laminate structures of this invention.

As presently understood by applicant, binding the talc into the structure with a coupling agent such as maleic anhydride-modified polypropylene homopolymer permits a substantial reduction in the weight percent of talc that can be used to cooperate with the PMMA in the lower outer skin layer to achieve the required antiblock properties in accordance with this invention. Specifically, as noted above, in accordance with the most preferred embodiments of this invention the weight percent of talc in the lower outer skin layer is less than 5%, while cooperating with even a lesser percentage by weight of PMMA and/or silica to provide the required antiblock properties for permitting the desired separation of individual polyolefin sheets from a stack and from a shingled arrangement during the feeding of the sheets into a high speed printer at speeds that are faster than with the use of prior art sheets. This use of a low percentage of talc in conjunction with the coupling agent also reduces the amount of dusting as compared to prior art structures.

It should be understood that although this invention has been described in connection with a three layer sheet structure or laminate, the number of layers in this structure or laminate can be varied in accordance with the broadest aspects of this invention. For example, the sheet or laminate can be formed with three, four, five or even more layers if desired.

Moreover, the individual layers of the sheet can be co-extruded or some of the layers can be applied by a separate coating or extruding operation, either after the film has been extruded and biaxially oriented, or after the film has been oriented in the machine direction, but prior to the sheet having been oriented in a transverse direction.

Numerous benefits are achieved in accordance with this invention. Specifically, this invention provides, among other benefits: (1) better label picking (de-stacking) of labels from a magazine; (2) better finishing/processing of printed label sheets before labels are cut therefrom; (3) decreased tendency for ink offsetting (transfer from the upper print surface to the lower back or outer surface of printed sheets in a stack before cutting labels from the sheets and bundling them in a stack; (4) decreased blocking tendency of labels in a stack; (5) reduced dusting and (6) increased speeds in directing sheets through a printer without double picking.

Although the present invention has been described in connection with preferred embodiments thereof, it will be appreciated by those skilled in the art that additions, modifications, substitutions and deletions not specifically described may be made without departing from the spirited scope of the invention defined in the appended claims.

What I claim as the invention is the following:

1. A sheet configured to be fed into a high speed printer for forming printed labels or other printed sheet material, said sheet comprising:
   an upper outer skin layer comprising a first polyolefin polymer as a predominant component by weight thereof and being effective to receive printed indicia from the high speed printer;
   a lower out skin layer; and
   a core layer between the upper outer skin layer and the lower outer skin layer, said core layer comprising a second polyolefin polymer as the predominant component, by weight, of the core layer,
   wherein said lower outer skin layer comprises:
   a third polyolefin polymer as the predominant component by weight thereof;
   talc in an amount of 1% to 5% by weight of the lower outer skin layer;
   silica in an amount of at least 0.25% by weight of the lower out skin layer;
   polymethylmethacrylate (PMMA) in an amount of 0.25% to 5% by weight of the lower outer skin layer; and
   a maleic anhydride-modified polypropylene homopolymer.

2. Printed labels cut from the sheet of claim 1 and maintained in a stack to be individually fed from the stack for use in labeling articles.

3. A stack comprising more than one plastic sheet of claim 1, said stack including adjacent leading and trailing plastic sheets, said stack being assembled such that the leading plastic sheets are directed through the high speed printer prior to adjacent, trailing sheets, and said lower outer skin layer of the leading plastic sheets are at least in partial engagement with said upper outer skin layer of the adjacent trailing plastic sheet.

4. The stack of claim 3, said stack being assembled such that said leading and adjacent trailing sheets are retained in the stack from which the leading sheets and adjacent trailing sheets are fed into and through the high speed printer in a shingled arrangement wherein distal ends of the lower outer skin layers of the leading sheets engage upper proximal outer skin layers of the trailing sheets.

5. A plurality of labels in a stack, each label of the plurality of labels comprising:
an upper outer skin layer comprising a first polyolefin polymer as a predominant component by weight thereof and being effective to receive printed indicia from the high speed printer;
a lower out skin layer; and
a core layer between the upper outer skin layer and the lower outer skin layer, said core layer comprising a second polyolefin polymer as the predominant component, by weight, of the core layer,
wherein said lower outer skin layer comprises:
a third polyolefin polymer as the predominant component by weight thereof;
talc in an amount of 1% to 5% by weight of the lower outer skin layer;
silica in an amount of at least 0.25% by weight of the lower outer skin layer;
polymethylmethacrylate (PMMA) in an amount of 0.25% to 5% by weight of the lower outer skin layer; and
a maleic anhydride-modified polypropylene homopolymer.

6. The sheet of claim 1, wherein each of the first polyolefin polymer, the second polyolefin polymer and the third polyolefin polymer is a polypropylene homopolymer or a copolymer of polypropylene and 2% by weight or less of ethylene.

7. The sheet of claim 1, wherein the amount of talc in the lower outer skin layer is 1.75% by weight of the lower outer skin layer; the amount of silica in the lower outer skin layer is 0.25% by weight of the lower outer skin layer; the amount of PMMA in the lower outer skin layer is 0.25% by weight of the lower outer skin layer; and the maleic anhydride-modified polypropylene homopolymer is present in an amount of 5% by weight of the lower outer skin layer.

8. The plurality of labels of claim 5, wherein each of the first polyolefin polymer, the second polyolefin polymer and the third polyolefin polymer is a polypropylene homopolymer or a copolymer of polypropylene and 2% by weight or less of ethylene.

9. The plurality of labels of claim 5, wherein the amount of talc in the lower outer skin layer is 1.75% by weight of the lower outer skin layer; the amount of silica in the lower outer skin layer is 0.25% by weight of the lower outer skin layer; the amount of PMMA in the lower outer skin layer is 0.25% by weight of the lower outer skin layer; and the maleic anhydride-modified polypropylene homopolymer is present in an amount of 5% by weight of the lower outer skin layer.

* * * * *